Sept. 4, 1956  E. J. HERBENAR ET AL  2,761,326
POWER STEERING MECHANISM
Filed June 23, 1954
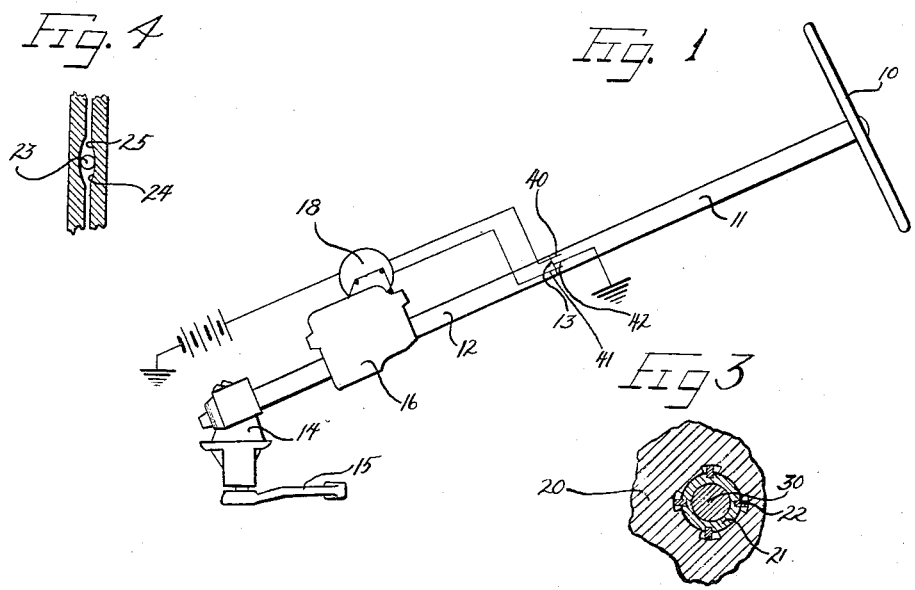
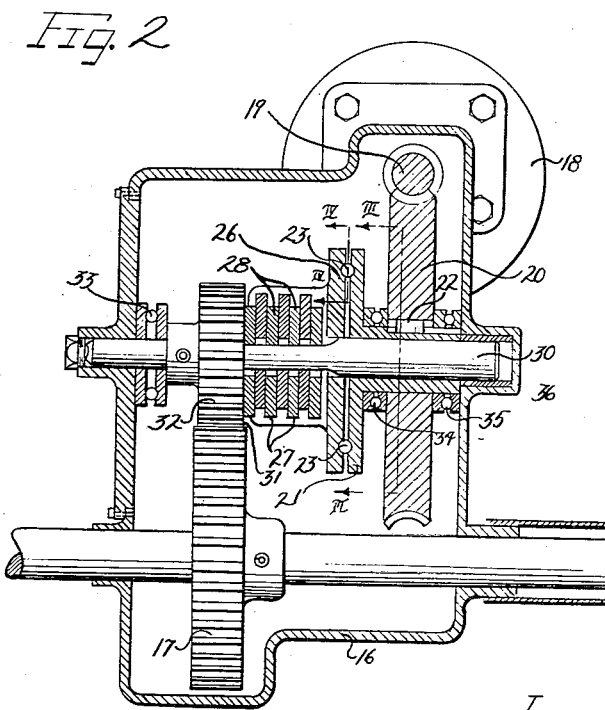
Inventors
EDWARD J. HERBENAR
SYLVESTER S. MAZUR
by Hill, Sherman, Meroni, Gross + Simpson
Attys.

United States Patent Office 2,761,326
Patented Sept. 4, 1956

2,761,326

POWER STEERING MECHANISM

Edward J. Herbenar and Sylvester S. Mazur, Detroit, Mich., assignors to Thompson Products, Inc., Cleveland, Ohio, a corporation of Ohio Application June 23, 1954, Serial No. 438,817

6 Claims. (Cl. 74—388)

The present invention relates to apparatus for rendering power assistance to manual steering systems associated with dirigible wheels or the like. More particularly, the present invention is concerned with the provision of a novel and extremely simple power steering booster for attachment to conventional automobile, marine, or aircraft steering linkages.

Applicants are, of course, aware that numerous systems having been devised for providing a power assist to manual steering systems. However, the power steering systems with which applicants are aware have failed to provide the extremely simple and yet highly versatile power steering system required by the automotive industry. It has now become apparent that power steering is a very desirable feature or "extra" and there is no longer any doubt that power steering will, in some form, ultimately be used almost universally in the automotive industry. However, while present day power steering systems are suitable for the high cost luxury type automobiles, there has not, to our knowledge, been a power steering unit developed that has proved satisfactory for installation on the inexpensive automobiles.

In order to overcome the lag in the use of power steering with inexpensive vehicles, the present invention has provided a power steering system capable of use as original equipment on vehicles or the like with an absolute minimum of cost and with a maxium of operating efficiency. According to the present invention, an electric motor power source is provided, thereby eliminating the highly complex and expensive hydraulic systems used in prior commercial power steering forms. Further, the electric power motor is provided with a simplified clutching construction for assuring proper power steering operation and at the same time permitting unusually free manual steering in the absence of power from the electric motor. By a novel lost motion clutch control system binding and drag are completely eliminated from the electric motor drive so that reversal of the motor or shifting from power to manual steering may be accomplished in an extremely rapid fashion without experiencing any feeling of temporary loss of control.

It is therefore an object of the present invention to provide a novel power steering booster of simplified construction and which is capable of manufacture at a low cost without sacrificing efficiency.

Another object of the present invention is to provide a novel electrical power steering apparatus for dirigible vehicles or the like.

Still a further object of the present invention is to provide a novel power steering motor and clutch combination that is substantially automatically self releasing upon the removal of drive torque.

Still a further object of the present invention is to provide a novel clutch engaging means for use with power assist apparatus and which minimizes drag in clutch engagement and disengagement.

A feature of the present invention is a lost motion connection between a power steering motor and the power steering clutch for permitting rapid acceleration of the motor upon the application of power thereto and before initial engagement of the clutch surfaces.

Another feature of the invention is the provision of a wedge type roller clutch automatically operable upon the application of power to one side thereof and which is provided with lost motion between said one side and the source of engaging power.

Still other and further objects and features of the present invention will at once become apparent to those skilled in the art from a consideration of the attached drawings wherein:

Figure 1 is a diagrammatic view of a steering column illustrating the association of the components of the present invention therewith;

Figure 2 is an enlarged cross-sectional view, in elevation, of the novel power booster of the present invention;

Figure 3 is a cross-sectional view taken along the line III—III of Figure 2 and illustrating applicants' novel lost motion clutch actuation connection; and Figure 4 is a cross-sectional view taken along the line IV—IV of Figure 2 illustrating the construction of the clutch of the present invention.

As shown in the drawings:

As may be seen from a consideration of Figure 1, the power steering system of the present invention is adapted for use with a generally conventional manual steering system having a steering wheel 10 secured to a steering shaft 11 which is in turn drivingly connected to the secondary steering shaft 12 through a lost motion coupling indicated generally at 13. The shaft 12 drives a conventional steering reduction gear 14 which in turn provides a reduced rotary output to the pitman arm 15 connected to the steering linkage. The shaft 12 is rotatably mounted within the power booster housing 16 and carries a gear 17 secured thereto for providing a power assist to the shaft.

The power assist or booster apparatus associated with the housing 16 comprises generally an electric motor 18 actuated by an electrical control system to be discussed below. The output of the motor 18 is supplied by the worm shaft 19 to the worm wheel 20 which is drivingly connected to the clutch plate 21 by means of a lost motion connection 22. Rotation of the worm wheel 20 by the worm 19 causes the lost motion connection 22 to be taken up and, after a slight lag, the clutch plate 21 to rotate. Rotation of the plate 21 will cause the balls 23 to roll up the respective ramps 24, 25 depending upon the direction of motor rotation, thereby forcing the clutch housing 26 away from the clutch plate 21. Axial movement of the housing 26 causes compression of the stacked clutch members 27, which are splined to the housing 26, against the clutch segments 28, which are splined to the intermediate shaft 30, against the face 31 of the gear 32.

Compression of the clutch elements 27 and 28 causes the gear 32 to rotate with the clutch housing 26 which is driven positively through the wedged balls 23. The output from the gear 32 is applied to the gear 17 on the shaft 12 thus causing a rotation of the shaft 12 automatically upon operation of the electric motor 18.

As may clearly be seen from Figure 2, the reaction forces applied by the clutching action are directed substantially in the axial direction. Since the gear 32 is directly acted upon by the clutch elements all of the axial load resulting from operation of the clutch may be absorbed very simply by the outer housing 16 itself. This is accomplished in the present invention through the provision of the anti-friction thrust bearing 33 between the gear 32 and the housing 16, and the anti-friction thrust bearings 34 and 35 between the clutch plate 21 and the worm wheel 20 and between the worm wheel 20 and the housing 16, respectively. As a result of the use of these thrust bearings none of the thrust of the clutch is transmitted to the support bearings for the shaft 30, thereby eliminating need for the relatively expensive tapered roller bearings oftentimes required in prior art clutching constructions. With this elimination of axial forces from the shaft 30, conventional sleeve bearings such as shown at 36 may be utilized.

In operation, the electric motor 18 is energized in any conventional manner upon the initiation of a predetermined steering torque in either direction. As is shown schematically in Figure 1, the shaft 11 will, upon a predetermined steering torque, rotate relative to the shaft 12 causing movement of the contacts 40 or 41 relative to the grounded contact 42. In a preferred embodiment the contact 40 is connected to the electric motor 18 to cause right hand steering effort thereby and the contact 41 is connected to the electric motor 18 to cause a left hand steering movement thereby. The contacts 40 and 41 are, of course, affixed firmly to the shaft 12 and rotation of the shafts 11 and 12 relative to each other will, upon the application of sufficient steering torque cause a contact of the contact 42 with one or the other of the contacts 40, 41 to selectively energize the motor 18. It will be understood that while the above outlined steering torque responsive system for energization of the electric motor 18 is satisfactory, nevertheless this portion of the operative structure is considered conventional and numerous other motor energization systems may be utilized with the present invention without departing from the scope thereof.

Upon energization of the motor 18 in either direction of rotation, the worm wheel 20 immediately takes up the slack in the lost motion connection 22. The slack in the connection 22 is sufficient to permit approximately a 30° rotation of the worm wheel 20 relative to the clutch plate 21 before a positive drive is initiated. This is very advantageous in the initiation of power application since it permits the motor 18 to start in the unloaded condition and then apply a high torque to the clutch plate 21. Immediately upon the application of torque to the clutch plate 21 the balls 23 are shifted against the cam surfaces 24 or 25 as a result of the inertia of the clutch housing 26, and the clutch members 27 and 28 are engaged, thereby transmitting the drive from the worm wheel 20 to the gear 17.

Immediately upon the de-energization of the electric motor 18, the torque applied by the worm wheel 20 is reduced to zero. By utilizing a slightly reversible worm 19, removal of torque from the worm wheel 20 will permit the wheel 20 to back freely away from the positive engagement with the lost motion coupling 22 thereby permitting immediate disengagement of the balls 23 from the cam surface 24 or 25 with which it was drivingly engaged. It will be apparent that provision of the lost motion connection at 22 will positively prevent any binding action which might otherwise cause a slow or dragging disengagement of the clutch. This is true since the lost motion connection provides a free-rotating connection upon removal of the driving torque, for approximately 30° of rotation, then, the clutching engagement of the balls 23 will be abruptly broken, if it has not already been destroyed, by impact of the now reversely moving worm wheel 20. This impact provides a sharp tap to the balls 23 which will cause substantially instantaneous disengagement of the clutch surfaces without the possibility of binding. This is especially desirable in cases when it is necessary for substantially instantaneous overrunning of the shaft 12 relative to the motor 18 and its worm wheel 20. Such overrunning is readily accomplished as a result of the lost motion connection 30 without any accompanying drag whatever and, if the overrunning continues past the 30° lost motion connection, the sharp impact resulting from the sudden end of the lost motion will instantly disconnect the clutch.

The above described electric power steering booster is thus extremely simple and yet substantially free of expensive clutch structure. By providing the lost motion connection in combination with a wedging ball type clutch, a highly efficient clutching action is accomplished with a minimum of expense. Further, the compactness of the construction and the elimination of all hydraulic sources requiring motor driven pumps and similar devices, permits the ready installation of the present unit in practically any convenient spot on the steering column. Thus, the unit is highly adapted to use in the less expensive automobile units in which it is impractical to redesign the various automobile models to accommodate the steering unit. The present system is sufficiently compact and sufficiently independent of motor driven pumps or the like to permit its ready adaptation to practically any conventional automobile without modification of the automobile itself.

It will thus be apparent that we have provided a novel and extremely desirable power steering booster for use with dirigible wheels or the like and which is capable of simple manufacture and installation thereby permitting the addition of power steering to even the most inexpensive of modern vehicles. While variations and modifications may, of course, be made in the preferred embodiment above illustrated without departing from the novel concepts of the present invention such changes are considered within the scope of the present invention as defined by the appended claims.

We claim as our invention:

1. A power booster for a manually rotated steering shaft comprising a gear on said steering shaft, a second gear drivingly engaged with said first gear and carried by an intermediate shaft, a third gear on said intermediate shaft, means for rotating said third gear in response to manual steering torque, a clutch mounted on said intermediate shaft for connecting said second and third gears for the transmission of drive torque, and a mechanical limited lost motion connection between said third gear and said clutch.

2. A power booster for a manually rotated steering shaft comprising a gear on said steering shaft, a second gear drivingly engaged with said first gear and carried by an intermediate shaft, a third gear on said intermediate shaft, means for rotating said third gear in response to manual steering torque, a clutch mounted on said intermediate shaft for connecting said second and third gears for the transmission of drive torque, and a lost motion connection between said third gear and said clutch, said clutch comprising an automatic ball wedge clutch actuator for applying an axially directed clutch force between said second and third gears.

3. A power booster for a manual steering system comprising a rotatable steering shaft having a first gear fixedly secured thereto, reversible power means, and a clutchable driving connection between said reversible driving means and said gear, said clutch comprising a first rotatable member driven by said reversible driving means and carried by an intermediate shaft, a second rotatable member drivingly connected to said gear and carried by said intermediate shaft, axially engageable clutch means positioned between said first and second members, thrust means preventing axial separation of said first and second members, means actuating said axially engageable clutch upon rotation of said first member, and a mechanical limited lost motion connection between said first member and said last named means whereby impact actuation of said clutch is provided when said lost motion is taken up.

4. An electric power booster for power operation of a manual steering shaft comprising a reversible electric motor drivingly associated with a first gear means supporting said first gear on an intermediate shaft, a second gear on said intermediate shaft, means connecting said second gear to said steering shaft, and automatic clutch means for engaging said first and second gears upon the application of torque to said first gear only by said electric motor, said clutch comprising a first wedge member on said intermediate shaft and a second wedge member on said intermediate shaft, said wedge members having a plurality of roller means positioned therebetween for axial movement thereof upon relative rotation between said wedge members, clutch members drivingly connecting one of said wedge members to said second gear, and a lost motion connection between the other of said wedge members and said first gear.

5. An electric power booster for power operation of a manual steering shaft comprising a reversible electric motor drivingly associated with a first gear means supporting said first gear on an intermediate shaft, a second gear on said intermediate shaft, means connecting said second gear to said steering shaft, and automatic clutch means for engaging said first and second gears upon the application of torque to said first gear only by said electric motor, said clutch comprising a first wedge member on said intermediate shaft and a second wedge member on said intermediate shaft, said wedge members having a plurality of roller means positioned therebetween for axial movement thereof upon relative rotation between said wedge members, clutch members drivingly connecting one of said wedge members to said second gear, and a lost motion connection between the other of said wedge members and said first gear, said lost motion connection permitting a substantial relative rotation between said other wedge member and said first gear whereby said electric motor may build up speed before energization of said other wedge member and whereby said wedge members are locked and unlocked by impact forces.

6. A power booster for a manually rotated steering shaft comprising a gear on said steering shaft, a second gear drivingly engaged with said first gear and carried by an intermediate shaft, a third gear on said intermediate shaft, means for rotating said third gear in response to manual steering torque, a clutch for connecting said second and third gears for the transmission of drive torque, means for actuating said clutch, and a mechanical limited lost motion connection between said third gear and said means for actuating said clutch whereby said third gear may rotate a predetermined limited distance prior to actuation of said clutch and transmission of drive torque between said second and third gears.

References Cited in the file of this patent
UNITED STATES PATENTS

| | | |
|---|---|---|
| Re. 23,673 | Penrose | June 30, 1953 |
| Re. 23,692 | Vickers | Aug. 4, 1953 |
| 1,144,552 | Lardner et al. | June 29, 1915 |
| 2,544,041 | Price | Mar. 6, 1951 |
| 2,553,795 | Staude | May 22, 1951 |
| 2,691,308 | Lincoln et al. | Oct. 12, 1954 |